United States Patent
Hewinson

(10) Patent No.: US 11,809,502 B1
(45) Date of Patent: *Nov. 7, 2023

(54) SELECTING CONTENT FOR DEVICES SPECIFIC TO A PARTICULAR USER

(71) Applicant: Google LLC, Mountain View, CA (US)

(72) Inventor: Philip Hewinson, London (GB)

(73) Assignee: Google LLC, Mountain View, CA (US)

(*) Notice: Subject to any disclaimer, the term of this patent is extended or adjusted under 35 U.S.C. 154(b) by 380 days.

This patent is subject to a terminal disclaimer.

(21) Appl. No.: 16/520,535

(22) Filed: Jul. 24, 2019

Related U.S. Application Data

(63) Continuation of application No. 15/186,000, filed on Jun. 17, 2016, now Pat. No. 10,394,911, which is a continuation of application No. 13/595,445, filed on Aug. 27, 2012, now Pat. No. 9,400,871.

(51) Int. Cl.
- G06F 16/9535 (2019.01)
- G06F 16/2457 (2019.01)
- G06F 16/28 (2019.01)
- G06F 16/958 (2019.01)

(52) U.S. Cl.
CPC .... *G06F 16/9535* (2019.01); *G06F 16/24578* (2019.01); *G06F 16/285* (2019.01); *G06F 16/958* (2019.01)

(58) Field of Classification Search
CPC .......... G06F 16/95; G06F 16/28; G06F 16/24
See application file for complete search history.

(56) References Cited

U.S. PATENT DOCUMENTS

| | | | |
|---|---|---|---|
| 8,478,794 B2 | 7/2013 | Aravamudan et al. | |
| 8,521,675 B2 | 8/2013 | Boyle et al. | |
| 8,751,492 B1* | 6/2014 | Catane | G06Q 30/02 |
| | | | 707/748 |
| 8,972,391 B1 | 3/2015 | McDonnell | |
| 8,972,396 B1 | 3/2015 | Zhang | |
| 2003/0135818 A1* | 7/2003 | Goodwin | G06F 16/313 |
| | | | 715/205 |
| 2007/0100796 A1* | 5/2007 | Wang | G06Q 30/02 |
| 2007/0156520 A1 | 7/2007 | Sharma | |
| 2009/0313217 A1 | 12/2009 | Signorini | |
| 2010/0042608 A1 | 2/2010 | Kane, Jr. | |
| 2010/0125500 A1 | 5/2010 | Beavers et al. | |

(Continued)

OTHER PUBLICATIONS

Heiko Dietze and Michael Schroeder "GoWeb: a semantic search engine for the life science web" Oct. 1, 2009, BMC Bioinformatics 2009.

*Primary Examiner* — Pierre M Vital
*Assistant Examiner* — Vy H Ho
(74) *Attorney, Agent, or Firm* — Fish & Richardson P.C.

(57) ABSTRACT

Methods, systems, and apparatus, including computer programs encoded on a computer storage medium, for selecting content for user devices specific to a particular user. The aspects generally relate to providing related content items to a particular user across multiple different user devices, such as mobile devices, tablet computers, desktop computers, and televisions. The selection of the content items for a particular user and the device to which the content items are to be sent are based one or more of the following factors: user history data, subject matter category duration, frequency duration adjustment, behavioral duration adjustment, and device prioritization.

20 Claims, 5 Drawing Sheets

(56) References Cited

U.S. PATENT DOCUMENTS

| | | |
|---|---|---|
| 2010/0205541 A1 | 8/2010 | Rapaport et al. |
| 2010/0312764 A1 | 12/2010 | Liao |
| 2011/0010243 A1 | 1/2011 | Wilburn et al. |
| 2011/0022606 A1 | 1/2011 | Mason |
| 2011/0029378 A1 | 2/2011 | Ramer |
| 2011/0184940 A1 | 7/2011 | Fazil |
| 2011/0258049 A1 | 10/2011 | Ramer et al. |
| 2011/0276408 A1 | 11/2011 | Toole |
| 2012/0005021 A1* | 1/2012 | Ratnam ............. G06Q 30/0256 705/14.54 |
| 2012/0030152 A1 | 2/2012 | Pueyo |
| 2012/0078725 A1 | 3/2012 | Maitra |
| 2012/0095985 A1 | 4/2012 | Shen |
| 2012/0197907 A1 | 8/2012 | Malyshev et al. |
| 2012/0233184 A1 | 9/2012 | Aravamudan |
| 2012/0265744 A1 | 10/2012 | Berkowitz |
| 2012/0290950 A1 | 11/2012 | Rapaport et al. |
| 2012/0316960 A1 | 12/2012 | Yang |
| 2013/0159885 A1 | 6/2013 | Yerli |
| 2013/0198145 A1 | 8/2013 | Avery et al. |
| 2013/0212491 A1 | 8/2013 | Yerli |
| 2013/0346187 A1 | 12/2013 | Brodsky |
| 2014/0164113 A1 | 6/2014 | Ramer |
| 2017/0034032 A1 | 2/2017 | Shuster |
| 2017/0289341 A1 | 10/2017 | Rodriguez |
| 2020/0120372 A1* | 4/2020 | Rieger ................ G06F 16/9577 |

* cited by examiner

SELECTING CONTENT FOR DEVICES SPECIFIC TO A PARTICULAR USER

CROSS-REFERENCE TO RELATED APPLICATIONS

This application is a continuation of U.S. application Ser. No. 15/186,000, filed Jun. 17, 2016, which is a continuation of U.S. application Ser. No. 13/595,445, filed Aug. 27, 2012, the entirety of each are incorporated herein.

BACKGROUND

This specification relates to providing content over a network.

The Internet enables access to a wide variety of content, e.g., video and/or audio files, web pages for particular subjects, news articles, etc. Such access to these content items likewise enables opportunities for serving additional content items with the content. For example, advertisements can be provided with search results in response to a search query provided by a user, or provided for web pages of third party online publishers that have content related to the advertisement.

Users typically access content over a multiple different services and devices. For example, users may access content on a particular device by use of different applications and through user devices of different device types. Examples of different applications are browsers, games, and specialized applications, commonly referred to as "apps." Examples of different device types are notebook computers, tablet computers, mobile device computers, desktop computers, and embedded computers such as computers in gaming consoles and televisions.

The content items that are provided to a particular user across multiple platforms often are selected without taking into account content provided among the different platforms associated with a particular user. For example, a user may execute a search and see advertisement related to that search. The user may then play a game on a smartphone and see completely different advertisements that may be somewhat related to the game they are playing, but completely unrelated to the advertisement that were provided during the search. Thereafter, the user may watch a television program and again see advertisements that are completely unrelated to the advertisement the user viewed in the game environment and the search environment. The disparate selection processes of the advertisements results in relatively unrelated advertisements being provided to a user across different devices. This, in turn, reduces the impact of the advertisements on the user.

SUMMARY

In general, one innovative aspect of the subject matter described in this specification can be embodied in methods that include the actions of accessing user history data for a user identifier associated with a user, the user history data describing a history of user events for a time period, each user event having occurred at one of a plurality of user-specific devices associated with the user identifier, each specified device being of a different device type, and each user event specifying one of an action or inaction taken by a user of the user-specific device at which the user event occurred; determining, from the user history data, relevant interest categories for which the user history data indicates at least a threshold relevance level, wherein the relevant interest categories defines a proper subset of a set of interest categories, and wherein the user history data do not indicate the threshold relevance level for each of the other interest categories not included in the relevant interest categories; accessing, for each relevant interest category, an interest category duration for the relevant interest category based on the user history data and the relevant interest category; receiving, at a particular time during which one or more user sessions identified by the user identifier are active, a request to serve a content item for one of the user sessions identified by the user identifier; selecting one of the plurality of user-specific devices in response to the request; and selecting a content item in response to the request based in part on the interest category durations and the device type of the selected user-specific device. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The content item selection process takes into account various user features across multiple different device types, enabling the selection of related content items across multiple devices. In the case of advertisements, the selection process thus reinforces an advertising opportunity for a particular user across multiple different platforms. Furthermore, the content item selection process is more likely to provide content that satisfies the user's informational needs than if the content items were selected separately for each user device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This technology generally relates to providing related content items, such as advertisements, to a particular user across multiple different user devices, such as mobile devices, tablet computers, desktop computers, and televisions. The selection of the advertisements for a particular user and the device to which the advertisements are to be sent are based one or more of the following factors: user history data, subject matter category duration, frequency duration adjustment, behavioral duration adjustment, and device prioritization.

The user history data includes user history data for the particular user.

The subject matter category duration is a serving duration based on a category of the subject matter to which the relevant content items belong.

The frequency duration adjustment is an adjustment that is based on a frequency with which the particular user has indicated interest in the subject matter. The frequency duration adjustment may alter the subject matter category duration.

The behavioral duration is an adjustment that is based on behavioral patterns exhibited by the particular user, and may also alter the subject matter category duration.

The device prioritization is the prioritization of user devices for a particular user based on a prioritization scheme. The prioritization is used to select a device to which content items are to be served.

These features and other features are described in more detail below.

Example Operating Environment

Figure 1:
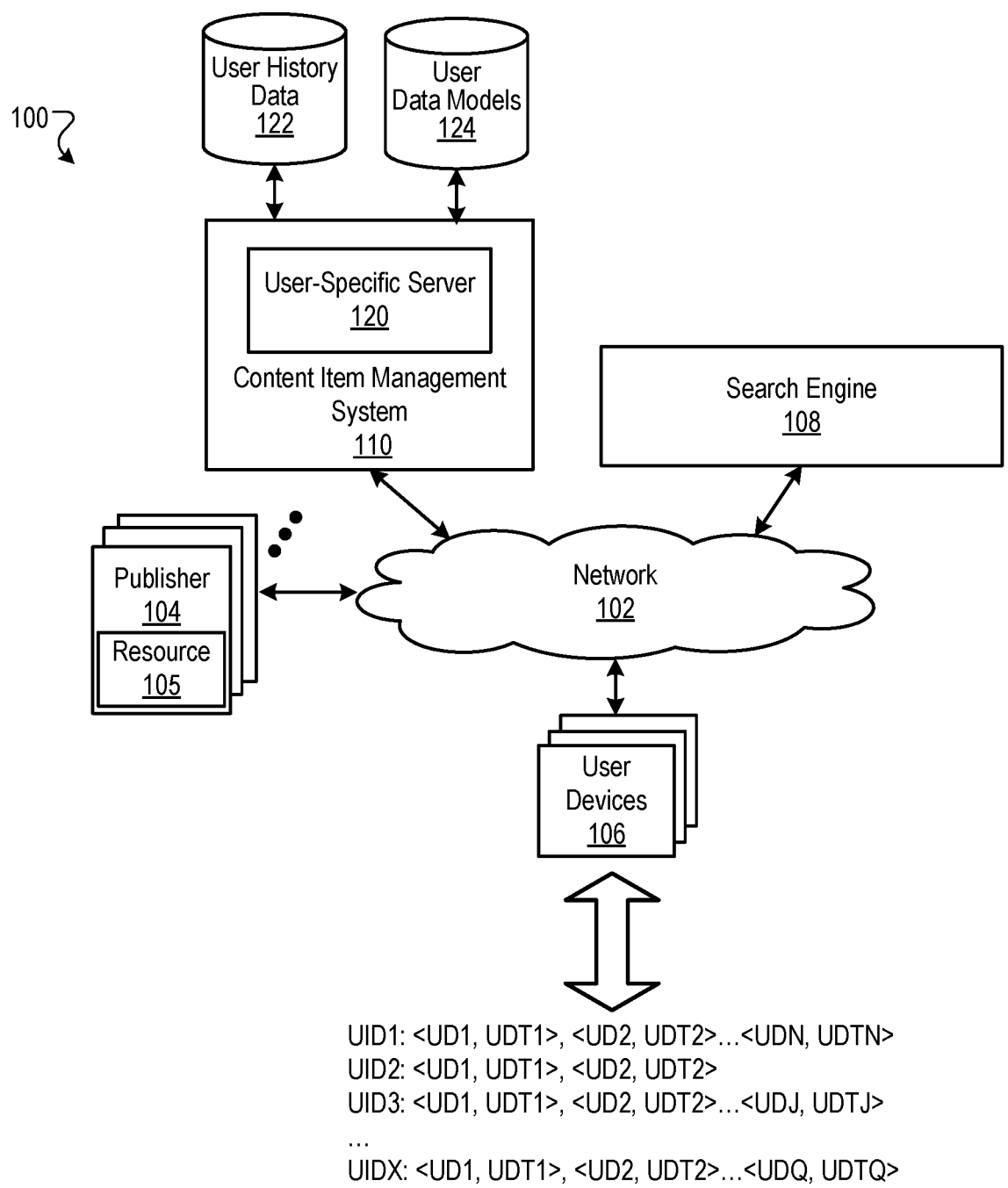
FIG. 1 is a block diagram of an example environment in which content items are selected for multiple devices associated with a particular user.

FIG. 1 is a block diagram of an example environment 100 in which content items are selected for multiple devices associated with a particular user. A computer network 102, such as the Internet, connects publisher web sites 104, user devices 106, information distribution services 108, and an advertisement management system 110. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network. As described above, there may be many different types of devices, such as desktop devices, mobile devices, television devices, and the like.

Often a user may be associated with a user identifier, such as an account identifier managed by the content item management system 110. The user identifier may be used to associate multiple user devices on a per-user basis. The account is resolved across multiple devices and services (e.g., phones, tablets, computers, televisions, e-mail accounts, Internet accounts, etc.). For example, as shown in FIG. 1, the user identifiers UID1 . . . UIDX are each associated with respective user devices of particular device types. For example, for user identifier UID1, the following tuples <UD1, UDT1>, <UD2, UDT2> . . . <UDN, UDTN> each identify a user device UD, and each user device is of a particular device type UDT, e.g., UD1 may be a "tablet" device type; UD2 may be a "mobile" device type, and so on. As will be described in more detail below, the association of user-specific devices on a per-user basis facilitates the provisioning of related content items across the multiple user-specific devices.

The environment 100 also includes a search engine that indexes the resources provided by the publisher web sites 104. The indexed and, optionally, cached copies of the resources, are stored in a resource index. The user devices 106 submit search queries to the search engine. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine, or some other identifier that identifies the user device 106 or the user using the user device. In response to the search request, the search engine uses the index to identify resources that are relevant to the queries. The search engine identifies the resources in the form of search results and returns the search results to the user devices 106 in search results page resource.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs, and click data for the queries and the web pages referenced by the search results are stored in click logs. The click logs define actions taken responsive to search results provided by the search engine. The click logs and query logs can thus be used by the search engine, and, optionally, other systems that have access to the logs, to determine the sequence of queries submitted by the user devices, the actions taken in response to the queries, and how often the queries are submitted.

The content item management system 110 facilitates the provisioning of content items with the resources 105. One example content item management system is an advertising management system. In particular, the content item management system 110 allows advertisers to define selection rules that take into account attributes of the particular user to provide advertisements for the users. Example selection rules include keyword targeting, in which advertiser provide bids for keywords that are present in either search queries or webpage content. Advertisements that are associated with keywords having bids that result in an advertisement slot being awarded in response to an auction are selected for displaying in the advertisement slots.

When a user of a user device 106 selects an advertisement, the user device 106 generates a request for a landing page of the advertisement, which is typically a webpage of the advertiser. For example, the publishers 104 may include advertisers, each having hosting respective web pages, some of which are landing pages for the advertisements of the advertisers.

These content items can be provided for many different user devices. In some implementations, the content item management system 110 utilizes a user-specific server 120 that selects content items for particular users and the device to which the content items are to be sent based one or more of the following factors: user history data, subject matter category duration, frequency duration adjustment, behavioral duration adjustment, and device prioritization. A more detail block diagram of the user-specific server 120 is described with reference to FIG. 2 below.

The content item management system 110 includes a data storage system that stores user history data 122 and user data models 124. The user history data 122 stores data indicating the performance of the advertisements that are served on a per-user basis. Such per-user performance data can include, for example, click through rates for advertisements, the number of impressions for advertisements, and the number of conversions for advertisements. Other appropriate user history data can also be stored, such as search information (e.g., queries, search result selections, etc.) provided by the search engine 108.

The user data models 124 are models on a per-user basis that take into account user history data, subject matter category duration, frequency duration adjustment, behavioral duration adjustment, and device prioritization and use these features to select content items that are to be served to users.

Various privacy protection processes can be used to ensure that a particular user's history protected from disclosure. For example, the user identities can be anonymized, and users may also choose to opt-out of (or opt-in to) the services provided by the user-specific server 120.

Content Selection System for User-Specific Devices

Figure 2:
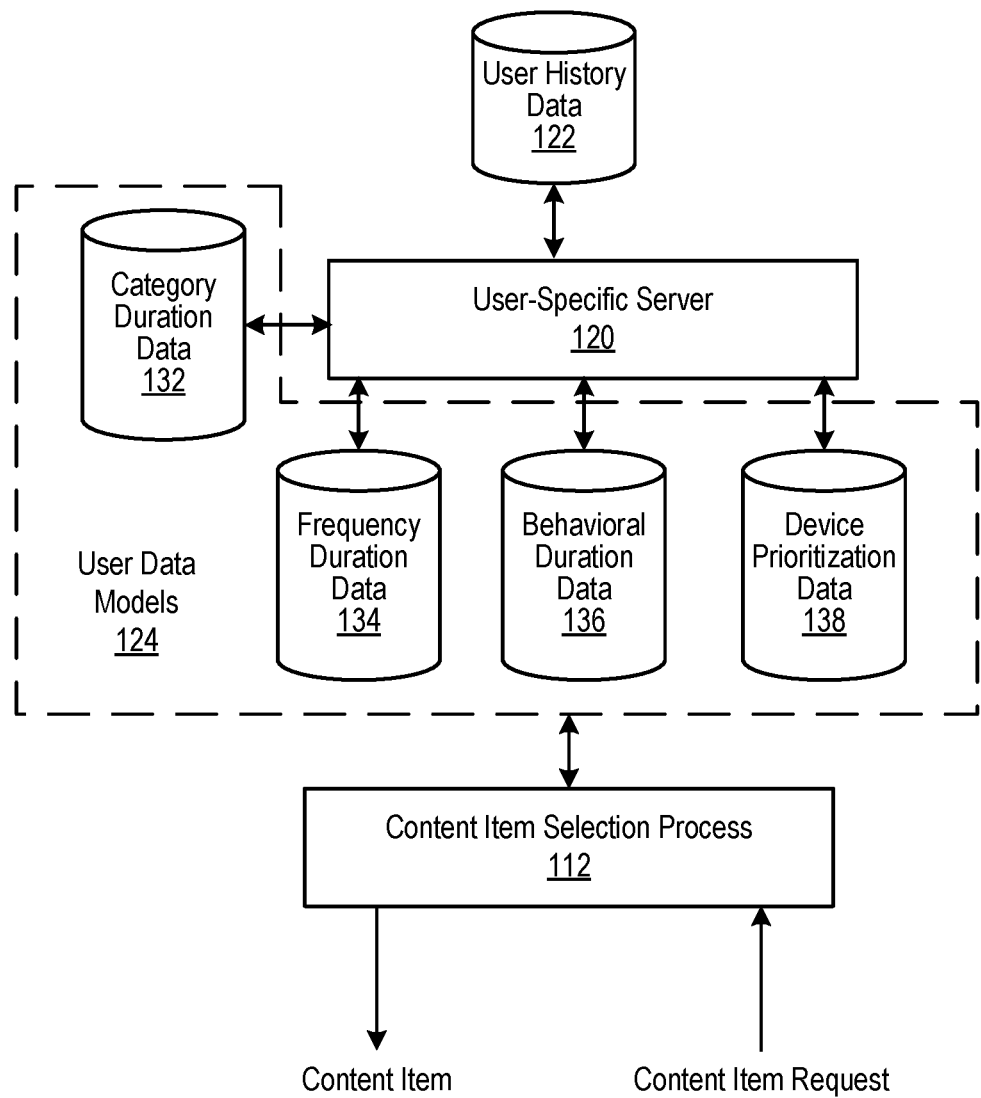
FIG. 2 is a more detailed block diagram of the content item management system that selects content items for multiple devices associated with a particular user.

FIG. 2 is a more detailed block diagram of the content item management system 110 that selects content items for multiple devices associated with a particular user. The selection of content items for a particular user and the device to which the advertisements are to be sent are based one or more of the following factors: user history data, subject matter category duration, frequency duration adjustment, behavioral duration adjustment, and device prioritization. These factors are accounted for each user in a corresponding user data model stored in the user data models 124 generated by the user-specific server 120.

While the user is logged into an account, the user-specific server 120 stores a history of the user's search queries and resulting selections, the content items (e.g., advertisements) served to the user and the corresponding selections of those content items. This information is used to determine a category of subject matter in which the user is interested, the frequency with which the particular user has indicated interest in the subject matter, and behavioral patterns exhibited by the user. In particular, the user history data describes a history of user events for a time period. Each user events occurred at one of the user-specific devices associated with the user identifier, and each specified device is of a different device type. Each user event specifies one of an action or inaction taken by a user of the user-specific device at which the user event occurred.

For example, the user history data for a particular user may indicate the user is interested in hotels in the Caribbean, and is also interested in football equipment. Thus the user-specific server may identify the categories of "Vacation," "Travel," and "Football" as being of interest to the user.

The category duration data 132 defines the effect of interest time duration on a performance metric for that category. For example, a user interested in the category "Travel" may only be responsive to travel-related content (e.g., advertisements, videos, or other content) during the peak summer travel season, or for a short period while booking a trip. On the other hand, a user interested in the category of "Sports" may be more responsive to sport-related content year round. The effect on the performance metric (e.g., expected click through rate for an advertisement) is provided to a content item selection process 112 (e.g., an auction) that selects content items in response to a content item request. For example, vacation planning often takes several weeks. Thus, if a particular user searched for hotels and flights to a particular destination, advertisements related to hotels and flights for that destination may be served to multiple different user devices of the user for several weeks. Conversely, if the user has searched for groceries (e.g., milk and bread), ads for nearby grocery stores may be served to multiple different user devices for only a single day, as most users tend to fill their grocery needs in a relatively brief time period.

In some implementations, the category duration data 132 is a per-category model of the effect of interest times on one or more performance metrics. As describe above, a model for a particular category may define a rapid decrease in performance over time, while a model for another category may define less performance attenuation (or even no performance attenuation) over time. The category duration data 132 may be determined from performance data for multiple users over time. In some implementations, the category duration data 132 is provided from another subsystem managed by the content item management system 110.

The frequency duration data 134 describe, for each user and interest category for the user, a frequency adjustment that is used to adjust the interest category duration of the interest category. A particular user may indicate a persistent interest in a subject, which results in a longer duration for the interest category related to the subject for the particular user. For example, a particular user may take a much longer time to decide on vacation plans, and/or may search far more often than other users for a particular subject. This indicates a much stronger and persistent interest in a subject, and thus the subject matter category duration for that topic may be extended. Generation and use of the frequency duration data is described with reference to FIG. 6 below.

The behavioral duration data 136 describe, for each user and interest category for the user, a behavioral adjustment that is used to adjust the interest category duration of the interest category for the particular user. A particular user may indicate a periodic interest in a subject, which results in a longer (or shorter) duration, or, alternatively, a unique duration for that particular user. For example, a particular user searches for movies every Friday afternoon between the hours of 2:00 PM and 5:00 PM. This is a signal that the user is interested in going to a movie during the weekend. However, on one particular Friday the user does not issue any movie searches. Due to the behavioral pattern, however, the system will still determine that promotions for movies (e.g., ads for particular theaters, discounts, etc.) should be provided to devices of the user for the subject matter category duration. Generation and use of the behavioral duration data is described with reference to FIG. 7 below.

The device prioritization data 138 is used to prioritize device selection for providing content specific to a particular user. Device prioritization is especially useful for resolving user presences collisions, which occur when a user session for a particular user identifier is active at two or more devices simultaneously. The server 120 determines a relative likelihood of user presence at each user device to resolve user presence collisions. Device prioritization can involve rules (e.g., work day hours tend to increase the likelihood of the user's work computer instead of the user's home computer); the type of device; and the activities observed at each device. For example, if a user's home computer and the user's phone are in use simultaneously, then the user's actual presence is determined to be more likely for the phone than the home computer. Likewise, if the user's television and the user's home computer are in simultaneous use, and the user's home computer is being used to access information that is consistent with the user's history, while the television is used to view a program that is not consistent with the user's viewing history, then the user's actual presence is determined to be more likely for the home computer than the television. Use of the device prioritization data is described with reference to FIG. 5 below.

Content Selection for User-Specific Devices

Using the above features in concert, the user-specific server 120 facilitates the selection of relevant content items for a user for a relevant duration, and serves the content items to the user at the device at which the user is most likely to be present.

Figure 3:
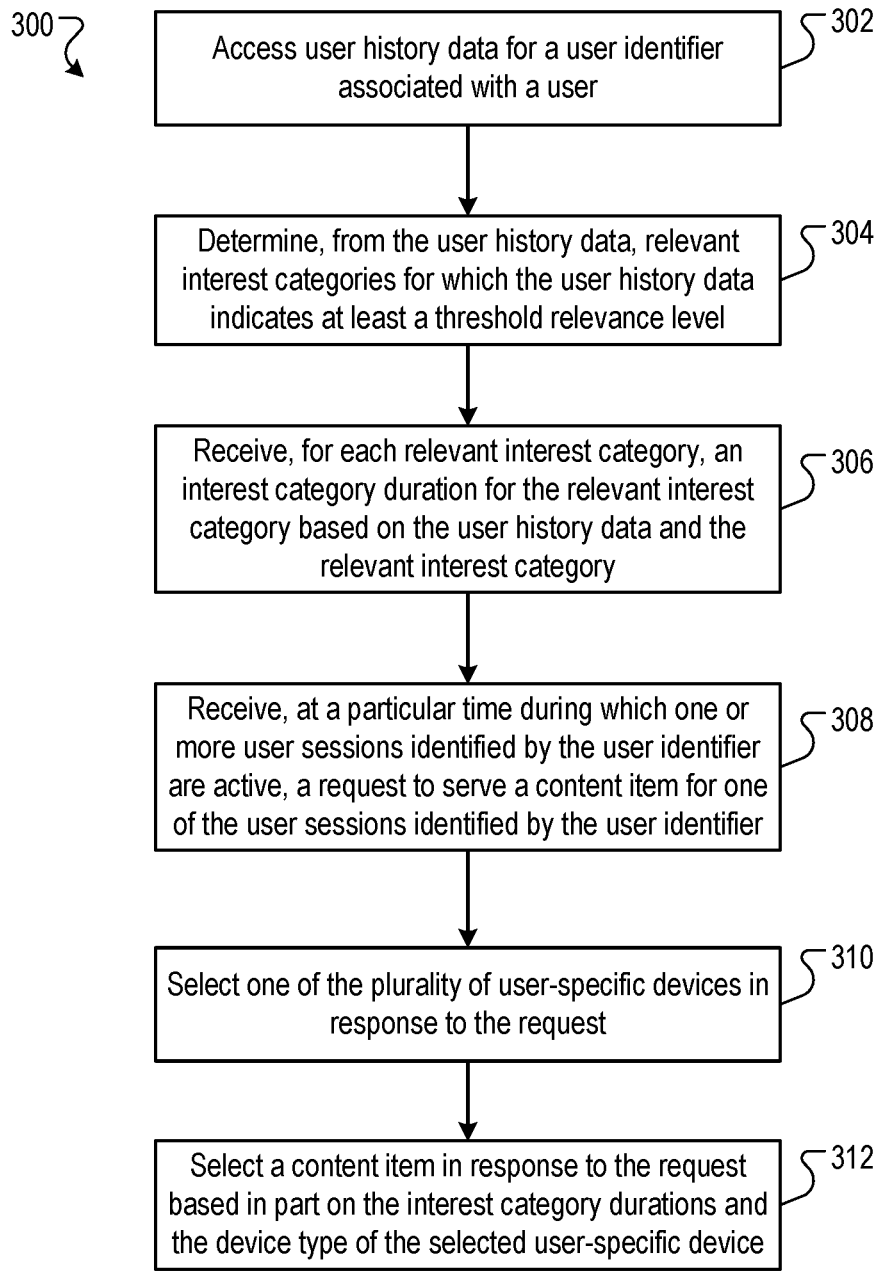
FIG. 3 is a flow diagram of an example process for selecting content items for multiple devices associated with a particular user.

FIG. 3 is a flow diagram of an example process 300 for selecting content items for multiple devices associated with a particular user. The process 300 can be implemented in a data processing apparatus in the content item management system 110.

The process 300 accesses user history data for a user identifier associated with a user (302). The user history data describes a history of user events for a time period. Each user event occurred at one of the user-specific devices associated with the user identifier. Each specified device can be of a different device type, and each user event specifies one of an action or inaction taken by a user of the user-specific device at which the user event occurred.

The process 300 determines, from the user history data, relevant interest categories for which the user history data indicates at least a threshold relevance level (304). The relevant interest categories define a proper subset of a set of interest categories. For example, the set of interest categories can be all categories in a category hierarchy, and the proper subset of interest categories are the categories for which the user history data indicates at least a threshold relevance level. Typically the user history data will not indicate the threshold relevance level for each of the other interest categories not included the relevant interest categories.

The relevance level for each category can be determined in a variety of appropriate ways. For example, data clustering of terms from search queries and web pages of selected search results, and from selected advertisements, can be used to determine a relevance level for each category. The threshold relevance level can be set by system administrators, and in some implementations may vary for each category. For example, categories that are prone to period interest levels, such as vacation locations, holidays, etc., may have a lower threshold relevance level than categories for which interest levels are less seasonal, such as sports, history, etc.

The process 300 receives, for each relevant interest category, an interest category duration for the relevant interest category based on the user history data and the relevant interest category (306). As described above, the interest category duration for each relevant interest category can be provided by another subsystem of the content item management system 110.

The process 300 receives, at a particular time during which one or more user sessions identified by the user identifier are active, a request to serve a content item for one of the user sessions identified by the user identifier (308). For example, at a particular time, a user may submit a query to a search engine, may request a resource from publisher, or may access a cloud-based mail service. Each of these actions may result in an opportunity to serve a content item in addition to the content requested by the user. Accordingly, a content item request for the user is provided.

The process 300 selects one of the plurality of user-specific devices in response to the request (310). In some implementations, the request may specify the user device to which the content item is to be provided. In other implementations, two or more user devices associated with the user may be active and both may have an active user session. Furthermore, both devices may be able to receive content items asynchronously or independently of the content already provided to the user device. For example, both user devices may be receiving streaming data for which content items can be served. In such situations, the process 300 selects one of the user devices according to a prioritization scheme.

The process 300 selects a content item in response to the request based in part on the interest category durations and the device type of the selected user-specific device (312). For example, if the interest category durations are such that at a particular time a sports related advertisement is most likely to be of greater interest to the user, then a sports related advertisement is selected. In some implementations, knowledge of prior advertisements provided to user-specific devices for a particular user identifier can be used as an additional selection constraint. For example, a particular set of advertisements can be provided in a sequence to the user over a time period during the interest category duration. Other selection constraints can also be used, such as remarketing lists, etc.

The user device type of the user device may also be taken into consideration when generating a relevance score for selecting a content item. For example, if the user device is a tablet computer, an advertisement optimized for a tablet environment may be selected. Conversely, if the user device type is a television, then a television commercial may be selected.

The selected content items are then provided to the selected user device.

Figure 4:
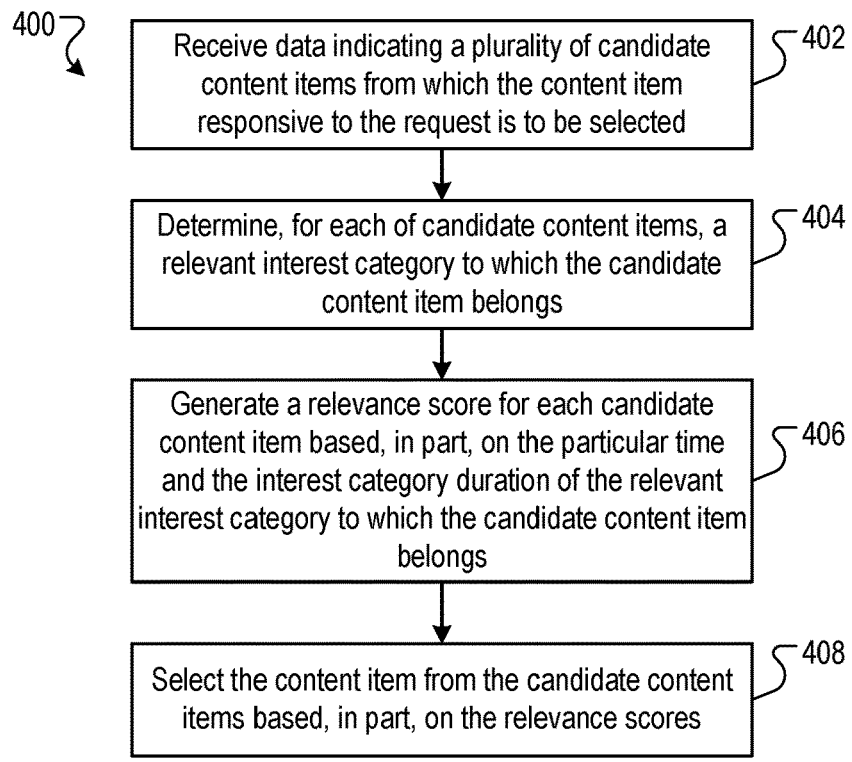
FIG. 4 is a flow diagram of an example process for selecting content items based on interest categories.

FIG. 4 is a flow diagram of an example process 400 for selecting content items based on interest categories. The process 400 can be implemented in a data processing apparatus in the content item management system 110, and can be used to select content items based on the interest category durations. The process 400 is but one example process to select content items for devices specific to a particular user, and other appropriate processes can also be used.

The process 400 receives data indicating a plurality of candidate content items from which the content item responsive to the request is to be selected (402). For example, for a particular content item request, multiple content items may be eligible for selection.

The process 400 determines, for each of candidate content items, a relevant interest category to which the candidate content item belongs (404). Each candidate content item, for example, may be tagged with corresponding interest categories to which the content item has been previously categorized.

The process 400 generates a relevance score for each candidate content item based, in part, on the particular time and the interest category duration of the relevant interest category to which the candidate content item belongs (406). For example, each interest category duration may have a corresponding origin time for the user. The origin time specifies a time at which user event for content belonging to the interest category occurred. For example, the origin time may be the first event time for a particular user event that corresponds to a particular interest category within a rolling time window for which interest category durations are determined. To illustrate, assume the rolling time window is one month, and the interest category is "travel." The first user event for this interest category occurred when user input a search for hotels in the Caribbean on Jul. 7, 2012 at 11:45 AM. Thus, the origin time is 11:45 AM, Jul. 7, 2012. The difference between the origin time and the particular time of the content item request is used to determine the effect of interest time duration on a performance metric for that category. For example, if the interest category duration for the category "Travel" indicates a linear decrease for a first week, the effect on the performance metric increases linearly with the magnitude of the difference between the origin time and the particular time of the content item request.

These effects on performance metrics, in turn, are used to adjust the relevance scores of the candidate content items. The process 400 then selects the content item from the candidate content items based, in part, on the relevance scores (408).

Figure 5:
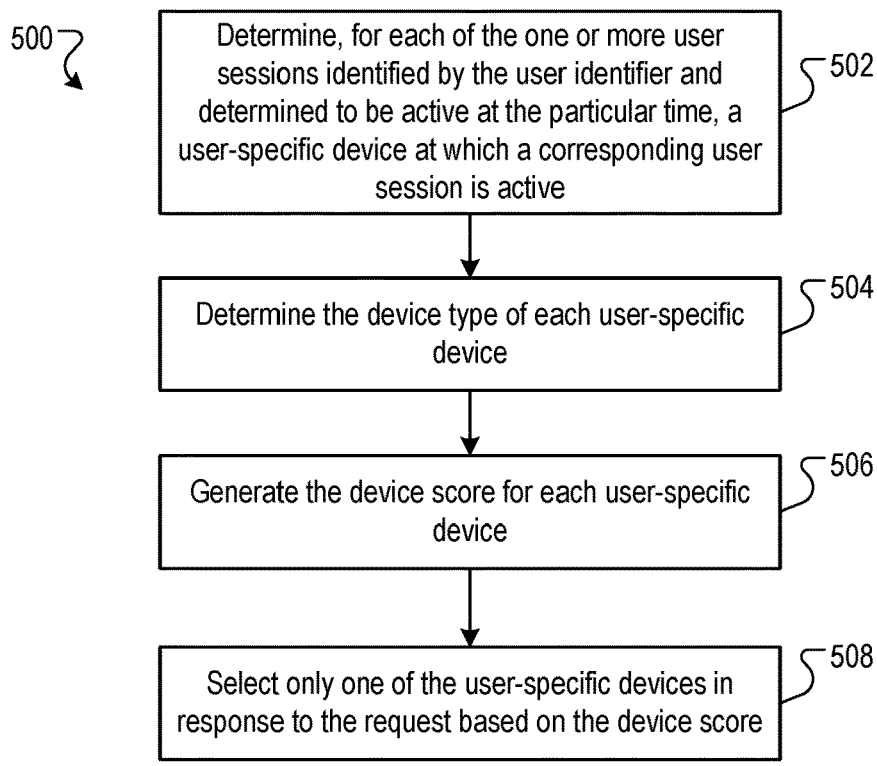
FIG. 5 is a flow diagram of an example process for selecting a user device for which a content item is to be provided.

FIG. 5 is a flow diagram of an example process 500 for selecting a user device for which a content item is to be provided. The process 500 can be implemented in a data processing apparatus in the content item management system 110.

The process 500 determines, for each of the one or more user sessions identified by the user identifier and determined to be active at the particular time, a user-specific device at which a corresponding user session is active (502). For example, for a particular user identifier, a user session associated with the user identifier may be active on several user devices.

The process 500 determines the device type of each user-specific device (504). For example, the user devices may be resolved to a mobile device, a desktop computer, and a television.

The process 500 generates the device score for each user-specific device (506). The device score may be generated based on a rule set. The rule set may be derived from user behavior and from likelihood models that model the likelihood that the actual user of the device is the user associated with the user identifier. For example, the rule set may specify that a mobile device with an active user session is always ranked higher than all other devices with an active user session for a user identifier because it is most likely that the actual user is present at the mobile device. Furthermore, in the event that the mobile device is not one of the devices with an active user session, the rule set may have a second most likely device (e.g., a tablet computer), a third most likely device (a laptop computer), etc.

In variations of this implementation, the prioritization scheme may be dependent on the particular time. For example, a user device associated with a user's work location may be prioritized higher than a user device associated with a user's home location between the hours of 8:00 AM and 6:00 PM. Conversely, the user device associated with a user's home location may be prioritized higher than the user device associated with a user's work location between the hours of 6:00 PM and 8:00 AM.

In still further variations of this implementation, the prioritization scheme may be dependent on the content served to the user device. For example, if two user devices have active sessions for a user identifier, and the session at the first device is receiving content that relates to one or more of the interest categories determined for the user identifier while the other session at the second user device is receiving content that does not relate to any of the one or more of the interest categories determined for the user identifier, then the first user device is prioritized higher than the second user device.

The process 500 selects only one of the user-specific devices in response to the request based on the device score (508). The content item is then provided to the selected user device.

Figure 6:
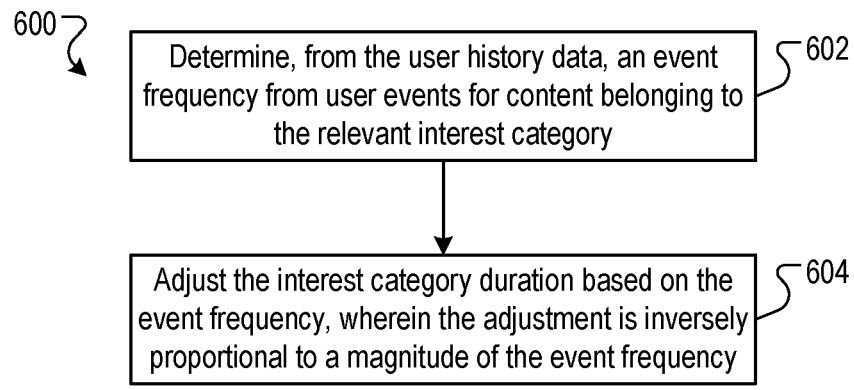
FIG. 6 is a flow diagram of an example process for adjusting an interest category duration based on a frequency duration adjustment.

FIG. 6 is a flow diagram of an example process 600 for adjusting an interest category duration based on a frequency duration adjustment. The process 600 can be implemented in a data processing apparatus in the content item management system 110.

The process 600 determines, from the user history data, an event frequency from user events for content belonging to the relevant interest category (602). As described above, a particular user may indicate a persistent interest in a subject, which results in a longer duration for the interest category related to the subject. The persistent interest is, in some implementations, indicated by an event frequency from user events for content belonging to the relevant interest category. The event frequency can, in some implementations, be the number of times that the particular user made an active action (and not an inaction) with respect to content related to the relevant interest category during a period of time. An active action is one in which the user interacts with or submits data related to content that belongs to the relevant interest category. For example, selecting an advertisement that belongs to the relevant interest category, submitting a search query that include terms that maps to the relevant category, and browsing web pages that belong to the relevant category are each an active action.

The process 600 adjusts the interest category duration based on the event frequency, wherein the adjustment is inversely proportional to a magnitude of the event frequency (604). For example, in some implementations, an average (or some other central tendency) of event frequencies for a set of users for a particular category is determined, and the event frequency for the particular user is compared to the average event frequency to generate an event frequency adjustment factor, e.g., where $$faf_j = f_{avg}/f_j$$

where $faf_j$ is the event frequency adjustment factor for the $j^{th}$ user identifier for a particular interest category;

$f_j$ is the event frequency for the $j^{th}$ user identifier for the particular interest category; and $f_{avg}$ is the average event frequency for the particular interest category.

Thus, the adjustment factor is inversely proportion to the event frequency. This, in turn, reduces the effect of interest decay defined by a particular interest category duration. Other techniques for determining a frequency adjustment factor, such as normalization, can also be used.

Figure 7:
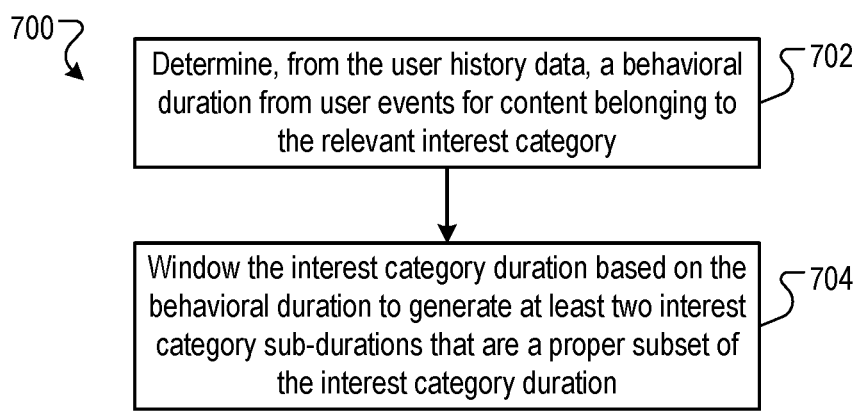
FIG. 7 is a flow diagram of an example process for adjusting an interest category duration based on a behavioral duration adjustment.

FIG. 7 is a flow diagram of an example process 700 for adjusting an interest category duration based on a behavioral duration adjustment. The process 700 can be implemented in a data processing apparatus in the content item management system 110.

The process 700 determines, from the user history data, a behavioral duration from user events for content belonging to the relevant interest category (702). For example, a particular user may exhibit interests in a particular interest category at particular times, e.g., only on certain days of the week and at certain times a user may exhibit active actions related to content that belongs to a relevant interest category for the user.

The process 700 windows the interest category duration based on the behavioral duration to generate at least two interest category sub-durations that are a proper subset of the interest category duration (704). For example, the interest category duration for a relevant interest category may be filtered so that the durations are divided into two or more interest category sub-durations that are a proper subset of the interest category duration. Thus, only during the sub-durations for a particular relevant interest category are content items that belong to the interest category capable of being selected for responding to a content item request.

By taking into account a combination of user history data, subject matter category duration, frequency duration adjustment, behavioral duration adjustment, and device prioritization, the system facilitates the selection of related advertisements for a user and enable as more consistent advertising selection strategy for a particular user across multiple different devices.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed in a data processing apparatus, comprising:
   determining, for a particular user identifier, an origin time specifying a time of occurrence of a request, by a user corresponding to the user identifier, for content in a particular interest category;
   receiving, at a particular time after the origin time, a request to serve content to the user corresponding to the user identifier with media related to a different interest category;
   upon receiving, at the particular time, the request to serve content to the user corresponding to the user identifier with the media related to the different interest category, calculating a time period that has elapsed between the particular time and the origin time of the particular interest category; and
   responding to the request to serve content based on the time period that has elapsed between the particular time and the origin time of the particular interest category, including:
      selecting, as selected content, a given portion of content that is in the particular interest category rather than content in the different interest category when the elapsed time between the particular time and the origin time is within a specified amount of time;
      selecting, as the selected content, a different portion of content that is in a given interest category other than the particular interest category when the elapsed time between the particular time and the origin time is greater than the specified amount of time; and
      transmitting, to a user device, data that presents the selected content.

2. The method of claim 1, further comprising determining, for each interest category, a difference between the particular time and the origin time of the interest category during a rolling time window, wherein the rolling time window is a predetermined length of time with a changing start time.

3. The method of claim 1, wherein at least two user sessions associated with the user identifier are active at the particular time, and wherein the method further comprises:
   determining, for each of the of user sessions identified by the user identifier and determined to be active at the particular time, a user-specific device at which a corresponding user session is active;
   generating a device score for each user-specific device; and
   selecting one of a plurality of user-specific devices in response to the request based on the device score.

4. The method of claim 3, wherein generating a device score for each user-specific device comprises:
   determining a device type of each user-specific device;

generating the device score for each user-specific device based on the device type of the user specific device and the particular time; and wherein the device score for at least one of the user-specific devices is time dependent and based on the particular time.

5. The method of claim 1, further comprising identifying, based at least in part on user history data and the origin time of the request for content in the particular interest category, an interest category duration specifying a bounded period of time of user interest in the particular interest category following the request.

6. The method of claim 5, further comprising:

determining, from the user history data specifying actions or inactions that are associated with the particular user identifier for a time period, an event frequency from user events for content belonging to the particular interest category; and adjusting the interest category duration based on the event frequency, wherein the adjustment is inversely proportional to a magnitude of the event frequency.

7. The method of claim 6, further comprising, for the particular interest category:

determining, from the user history data, a behavioral duration from user events for content belonging to the particular interest category; and windowing the interest category duration based on the behavioral duration, wherein the windowing generates at least two interest category sub-durations that are a proper subset of the interest category duration.

8. A system comprising:

a data processing apparatus; and a non-transitory computer storage medium encoded with instructions that when executed by the data processing apparatus cause the data processing apparatus to perform operations comprising:

determining, for a particular user identifier, an origin time specifying a time of occurrence of a request, by a user corresponding to the user identifier, for content in a particular interest category;

receiving, at a particular time after the origin time, a request to serve content to the user corresponding to the user identifier with media related to a different interest category;

upon receiving, at the particular time, the request to serve content to the user corresponding to the user identifier with the media related to the different interest category, calculating a time period that has elapsed between the particular time and the origin time of the particular interest category; and responding to the request to serve content based on the time period that has elapsed between the particular time and the origin time of the particular interest category, including:

selecting, as selected content, a given portion of content that is in the particular interest category rather than content in the different interest category when the elapsed time between the particular time and the origin time is within a specified amount of time;

selecting, as the selected content, a different portion of content that is in a given interest category other than the particular interest category when the elapsed time between the particular time and the origin time is greater than the specified amount of time; and transmitting, to a user device, data that presents the selected content.

9. The system of claim 8, the operations further comprising determining, for each interest category, a difference between the particular time and the origin time of the interest category during a rolling time window, wherein the rolling time window is a predetermined length of time with a changing start time.

10. The system of claim 8, the operations further comprising determining, for each interest category, a difference between the particular time and the origin time of the interest category for each origin time during a rolling time window, wherein the rolling time window is a predetermined length of time with a changing start time.

11. The system of claim 8, wherein at least two user sessions associated with the user identifier are active at the particular time, and wherein the instructions cause the data processing apparatus to perform operations further comprising:

determining, for each of the user sessions identified by the user identifier and determined to be active at the particular time, a user-specific device at which a corresponding user session is active;

generating a device score for each user-specific device; and selecting one of a plurality of user-specific devices in response to the request based on the device score.

12. The system of claim 11, wherein generating a device score for each user-specific device comprises:

determining a device type of each user-specific device;

generating the device score for each user-specific device based on the device type of the user specific device and the particular time; and wherein the device score for at least one of the user-specific devices is time dependent and based on the particular time.

13. The system of claim 8, the operations further comprising identifying, based at least in part on user history data and the origin time of the request for content in the particular interest category, an interest category duration specifying a bounded period of time of user interest in the particular interest category following the request.

14. The system of claim 13, the operations further comprising:

determining, from the user history data specifying actions or inactions that are associated with the particular user identifier for a time period, an event frequency from user events for content belonging to the particular interest category; and adjusting the interest category duration based on the event frequency, wherein the adjustment is inversely proportional to a magnitude of the event frequency.

15. A non-transitory computer storage medium encoded with instructions that when executed by data processing apparatus cause the data processing apparatus to perform operations comprising:

determining, for a particular user identifier, an origin time specifying a time of occurrence of a request, by a user corresponding to the user identifier, for content in a particular interest category;

receiving, at a particular time after the origin time, a request to serve content to the user corresponding to the user identifier with media related to a different interest category;

upon receiving, at the particular time, the request to serve content to the user corresponding to the user identifier with the media related to the different interest category, calculating a time period that has elapsed between the particular time and the origin time of the particular interest category; and responding to the request to serve content based on the time period that has elapsed between the particular time and the origin time of the particular interest category, including:

selecting, as selected content, a given portion of content that is in the particular interest category rather than content in the different interest category when the elapsed time between the particular time and the origin time is within a specified amount of time;

selecting, as the selected content, a different portion of content that is in a given interest category other than the particular interest category when the elapsed time between the particular time and the origin time is greater than the specified amount of time; and transmitting, to a user device, data that presents the selected content.

16. The computer storage medium of claim 15, the operations further comprising determining, for each interest category, a difference between the particular time and the origin time of the interest category during a rolling time window, wherein the rolling time window is a predetermined length of time with a changing start time.

17. The computer storage medium of claim 15, the operations further comprising identifying, based at least in part on user history data and the origin time of the request for content in the particular interest category, an interest category duration specifying a bounded period of time of user interest in the particular interest category following the request.

18. The computer storage medium of claim 17, the operations further comprising:

determining, from the user history data specifying actions or inactions that are associated with the particular user identifier for a time period, an event frequency from user events for content belonging to the particular interest category; and adjusting the interest category duration based on the event frequency, wherein the adjustment is inversely proportional to a magnitude of the event frequency.

19. The computer storage medium of claim 17, the operations further comprising:

determining, from the user history data, a behavioral duration from user events for content belonging to the particular interest category; and windowing the interest category duration based on the behavioral duration, wherein the windowing generates at least two interest category sub-durations that are a proper subset of the interest category duration.

20. The computer storage medium of claim 15, wherein at least two user sessions associated with the user identifier are active at the particular time, and wherein the instructions cause the data processing apparatus to perform operations further comprising:

determining, for each of the user sessions identified by the user identifier and determined to be active at the particular time, a user-specific device at which a corresponding user session is active;

generating a device score for each user-specific device; and selecting one of a plurality of user-specific devices in response to the request based on the device score.

* * * * *